Aug. 10, 1965 F. M. YOUNG 3,200,346

OVERLOAD PROTECTION CIRCUIT FOR HIGH IMPEDANCE AMPLIFIERS

Filed Aug. 21, 1962

INVENTOR.
FRINK M. YOUNG
BY Kenway, Jenney & Hildreth
ATTORNEYS

United States Patent Office 3,200,346
Patented Aug. 10, 1965

3,200,346

OVERLOAD PROTECTION CIRCUIT FOR HIGH IMPEDANCE AMPLIFIERS

Frink Mansfield Young, Boston, Mass., assignor to Adage, Inc., Cambridge, Mass., a corporation of Massachusetts Filed Aug. 21, 1962, Ser. No. 218,334
8 Claims. (Cl. 330—110)

My invention relates to a novel and improved circuit for preventing overload damage to and limiting the output from high input impedance electrical signal amplifiers. More particularly, it relates to a novel and improved circuit utilizing switches and current sources which prevent either input or output overloads from damaging the amplifier and which provides rapid recovery from even very high overloads; the circuit of my invention is particularly applicable to the improved direct-coupled amplifier disclosed in my copending application Serial No. 25,086, filed April 27, 1960.

A direct coupled voltage amplifier having a very high input impedance is often used in connection with instrumentation to measure or monitor voltages in an operating circuit, the amplifier serving as an impedance matching device between the circuit under test and the measuring instrument. If the measuring instrument is expensive, the amplifier input terminals are sometimes switched between several points in the circuit to measure a number of voltages.

If a malfunction occurs in the circuit under measurement the amplifier may be subjected to an overload. Thus, an amplifier capable of providing unity gain and having an output capability of ±100 volts might be subjected to a 500 volt input signal in the event of circuit malfunction. Alternatively, the amplifier output terminals may be subjected to heavy loading, the worst condition, of course, being a short circuit. Either of these two types of overloads may damage the active elements of the amplifier; an overload which does not permanently damage the amplifier may cause it to become inoperative for a period of time even after it is removed until the condensers in the amplifier discharge, etc. When an amplifier is being switched between a number of voltage sources, the overload caused by one of the sources may result in improper readings on subsequent points of measurement.

From the foregoing it is apparent that it is desirable to provide an overload protection circuit for amplifiers of this type which will protect the amplifier itself in the event of overload at either input or output terminals and which additionally will permit rapid recovery of the amplifier to proper operation when the overload condition is removed.

It is a principal object of my invention to provide a novel and improved circuit for use with voltage amplifiers having high input impedance to protect them in the event of overloads at either their input or output terminals. Another object of my invention is to provide an overload circuit of the type described which will permit rapid recovery of the amplifier when the condition causing an overload is removed. A further object of my invention is to provide a novel overload protection circuit of the type described using the reverse current characteristics of a pair of diodes as a nonlinear impedance. A still further object of my invention is to provide an overload circuit of the type described which is simple and economical in construction and reliable in operation. Other and further objects of my invention will in part be obvious and will in part appear hereinafter.

The invention accordingly comprises the features of construction, combination of elements, and arrangement of parts which will be exemplified in the construction hereinafter set forth and the scope of the invention will be indicated in the claims. For a fuller understanding of the nature and objects of my invention, reference should be had to the following detailed description taken in connection with the accompanying drawing in which:

Figure 1:
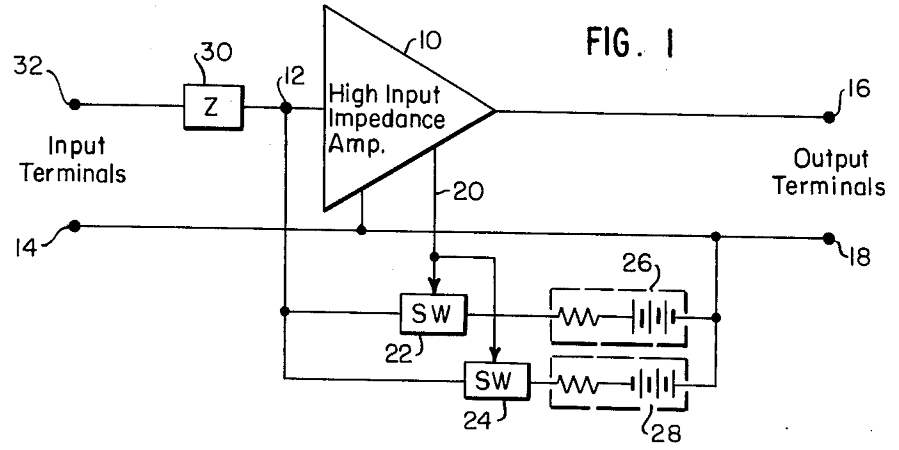
FIG. 1 is a block and line diagram useful in explaining the principles of my improved overload protection circuit.

In FIG. 1, I have shown a typical direct coupled high impedance amplifier 10 provided with an overload protection circuit made according to my invention. The amplifier 10 is provided with input terminals 12 and 14 and output terminals 16 and 18. As shown the terminals 14 and 18 are connected in common. Additionally, the amplifier 10 provides on lead 20 an indication of the state of loading of its output stage. For example, this might be a measure of the current through the output stage observed at one of the terminals of the output vacuum tube or transistor. The signal on lead 20 is applied to a pair of switches 22 and 24. These switches connect the current sources 26 and 28 respectively to the input terminal 12 of the amplifier. It will be observed that the current sources 26 and 28 (here shown as batteries with resistances in series) are of opposite polarity.

Depending upon the polarity of the overload one or another of the switches 22 or 24 is operated by the overload signal appearing on lead 20. Additionally, an impedance 30 is connected between the input terminal 12 of the amplifier 10 and the input terminal 32 of the overload-protected amplifier. When an overload is indicated by the signal on lead 20, one of the switches 22 or 24, which is normally open, is closed. When the switch closes a potential corresponding to that on the lead 20 is connected to the terminal 12, clamping it to this value. If the input potential is such that the terminal 12 would normally be at a different potential than that to which it is clamped, the difference appears across the impedance 30 as a result of current supplied from one of the current sources.

For example, assume that a positive overload exists between the terminals 32 and 14. Until one of the switches operates, the current flowing through the impedance 30 and into the amplifier input terminal 12 will be determined by the amplifier input impedance and the size of the impedance 30, the size of impedance 30 being small in comparison with the amplifier input impedance. To protect the amplifier, it is necessary to limit the voltage appearing across terminals 12 and 14. With a positive overload, the signal on lead 20 would cause switch 24 to close, thus holding the potential at terminal 12 at a value corresponding to that on lead 20. Because of the polarity of the current source 28 associated with the switch 24, current flow through the impedance 30 will be in a direction such that the voltage across the impedance 30 will oppose the signal voltage. For a negative polarity of overload, the same situation would occur except that switch 22 rather than switch 24 would be operated by the signal on lead 20, and the necessary current would be supplied by the current source 26.

The foregoing discussion explains how the amplifier output signal is limited and the amplifier is protected against input overload. Output overloads are caused principally by very low impedances or short circuits across the output terminals. The effect of this low impedance is to overload the output stage by requiring it to supply a heavy output current. If, as is usual, the active element of ths output stage of the amplifier is supplied from a power supply with a series impedance and the output signal is taken from the end of the series impedance not connected to the power supply, short circuiting the output terminals merely bypasses the output tube or transistor and connects the series impedance directly across the power supply. If the power supply has sufficient capacity and the series impedance is sufficiently large, this will not burn out the power supply. However, if the output tube or transistor is depending upon current from the power supply for bias, the absence of bias may cause it to burn out if a substantial signal is supplied to its control grid or base as the case may be. By clamping the amplifier input voltage to a safe value when an overload is sensed the possibility of transistor or tube damage is substantially reduced.

Figure 2:
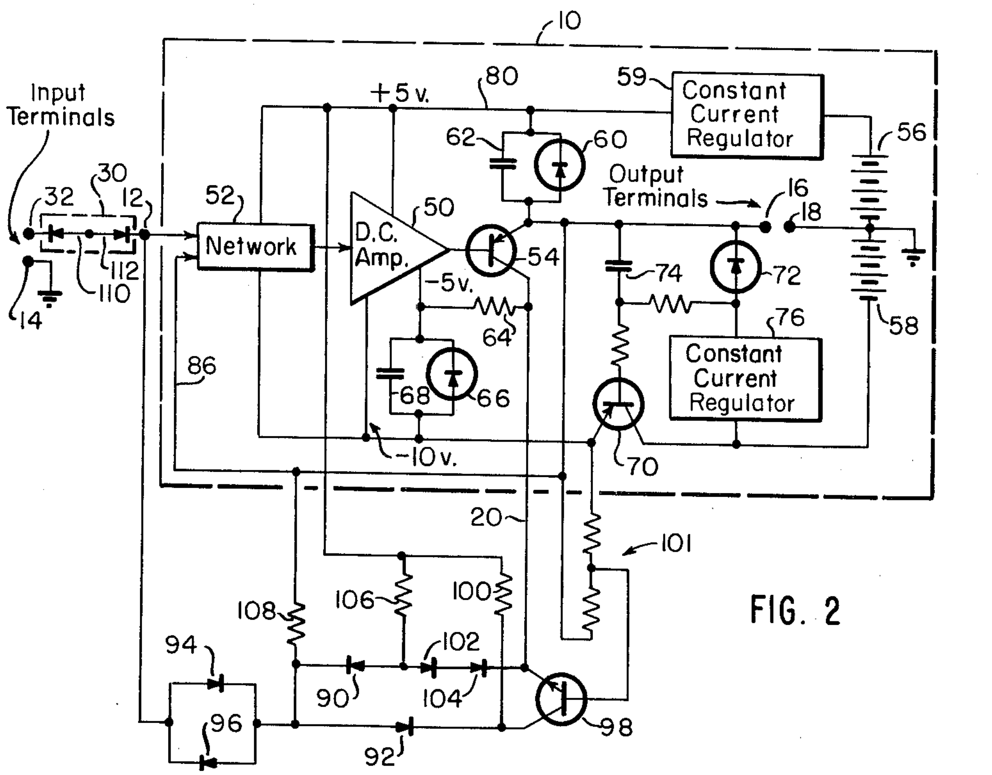
FIG. 2 is a block and line diagram of the overload protection circuit as applied to the improved electrical signal amplifier disclosed in my copending application, Serial No. 25,086 referred to above.

In FIG. 2, I have illustrated a specific circuit for the overload protection circuit of my invention as applied to an amplifier of the design disclosed in my copending application Serial No. 25,086 heretofore discussed. The referenced application includes a complete description of the construction and operation of the amplifier circuit shown in FIG. 2 and enclosed within the dotted rectangle. In accordance with the numbering used in FIG. 1, the amplifier enclosed within the dotted rectangle is labeled 10. External to the dotted rectangle is the improved overload protection circuit of the present invention.

Before describing the overload protection circuit, I will briefly review the construction and operation of the amplifier 10. As shown therein, a direct voltage amplifier 50 of conventional design is connected to the input terminal 12 of the amplifier 10 through the network 52. This network includes both a high frequency path to the input terminal of the D.C. amplifier 50 and a low frequency path which includes an A.C. amplifier, chopper and modulator circuit. The output terminal of the D.C. amplifier 50 is connected to the base of the transistor 54, transistor 54 being the output transistor of the amplifier. The output terminal 16 of the amplifier is connected directly to the emitter of the transistor 54. The power supply for the output stage includes a positive voltage supplied by a battery 56 or a power supply and a negative voltage supplied by a battery 58 or equivalent power supply. The positive battery 56 is connected to the emitter of transistor 54 through the constant current regulator 59 and through the parallel combination of the Zener diode 60 and the capacitor 62.

The collector of transistor 54 is connected through the resistor 64 and the parallel combination of a Zener diode 66 and capacitor 68, to the emitter of a transistor 70. The base of transistor 70 is biased at a constant potential below the output potential of the amplifier by the Zener diode 72, the capacitor 74 acting as a noise suppression capacitor. The constant current regulator 76 is provided to insure that the Zener diode 72 stays "lighted."

As more fully explained in the above-identified application, a significant feature of the amplifier shown is that power supplies for the network 52 and the D.C. amplifier 50 are referenced directly to the output terminal 16 rather than to ground. For reasons explained in the application, this provides a very high input impedance for this configuration.

The function of the Zener diode 60 and the noise suppression capacitor 62 is to provide a constant voltage which is 5 volts above (i.e. "positive" with respect to) the output terminal voltage on terminal 16. This is supplied on lead 80 to the D.C. amplifier 50 and to the network 52.

The base of transistor 70 is maintained at a potential approximately 10 volts below (i.e. "negative" with respect to) the output terminal 16 by the Zener diode 72. The emitter of the transistor 70 is therefore at this same —10 volts potential (except for the emitter-base diode voltage drop in transistor 70) and this negative 10 volts is also supplied to the D.C. amplifier 50 and the network 52 as a power supply voltage.

A voltage which is 5 volts "positive" with respect to this negative 10 volts is also supplied to the amplifier 50 through the combination of the Zener diode 66 and the noise suppression capacitor 68. It will be observed that the left-hand end of the resistor 64 in FIG. 2 is maintained at a potential which is exactly 5 volts below the potential of the output terminal 16. Therefore, the total voltage which can exist across the combination of the transistor 54 and the resistor 64 is 5 volts. The distribution of this voltage as between the resistor and the transistor depends of course upon the current flow through the transistor which in turn depends upon the base potential.

As is explained more fully in the above-identified application, large output voltage swings are accommodated by variations in voltage across transistor 70 with variations in the current flowing in the "string" which includes transistor 54, resistor 64 and transistor 70. It should also be noted that the amplifier 10 shown in FIG. 2 includes a feedback path from the output terminal 16 to the network 52 via lead 86 so that the amplifier has unity voltage gain.

The indication of a substantial overload for the amplifier 10 of FIG. 2 is provided on lead 20 which is connected as shown to the collector of transistor 54. The overload signal lead 20 is thereby "isolated" from the input terminal 16 by an active element i.e. by the collector-emitter path of the transistor 54.

In the event that the input terminals are subjected to a positive input voltage which is higher than could be provided by the output power supplies, the current through transistor 54 diminishes. A reduced current then flows through the resistor 64 and the Zener diode 66; the potential at the collector of transistor 54 drops toward the —5v. supply because of this reduced current. Conversely, if the potential applied to the base of transistor 54 is more negative than the maximum negative swing which can be provided by the circuit power supply capabilities, the transistor 54 will be saturated and, if this signal on the base is long continued the transistor will be damaged. Under these conditions, the voltage at the collector of transistor 54, because of the heavy current being supplied by transistor 54 will be more positive than its normal operating potential. Thus, the potential at the collector of transistor 64 indicates a positive input overload by a drop in voltage below its normal operating potential and a negative input overload by rising above its normal operating potential.

If the output terminals of the transistor are short circuited, a positive input voltage would have the same effect as would a positive overload and a negative input voltage has the same effect as the negative overload. The emitter potential of transistor 54 would then be fixed. A negative input voltage, even though not of a magnitude sufficient under normal conditions to overload the amplifier, would cause a negative potential at the base of transistor 54 which in turn would tend to make the transistor saturate. Similarly, a positive potential on the base would reduce the transistor current thus causing a drop in collector potential. Thus an output short circuit will provide an indication on the overload indicator lead 20 which is identical to that provided by a corresponding input overload.

The overload circuit itself comprises a pair of switching diodes 90 and 92 which are connected through the silicon buffer diodes 94 and 96 to the input terminal 12 of the amplifier 10. Each of the switching diodes 90 and 92 is connected to the overload indicator signal lead 20 through a biasing network.

It will be recalled that amplifier 10 is a unity gain amplifier. Thus the output terminal, the emitter of transistor 54 is at the same potential as the input terminal 12 which is also (disregarding the emitter-base voltage drop, which is negligible) the base potential of the transistor 54. The collector potential of the transistor is always below or negative with respect to the output potential and hence the input potential. Under these circumstances diode 92, which is of a polarity to conduct when there is a positive overload, would be conducting at all times and the diode 90 would never conduct at all if they were connected directly to the overload signal lead 20. Further, when the diodes 90 or 92 conduct, they will clamp the terminal 12 to the voltage appearing at their anode or cathode respectively. If the diodes were connected directly to the lead 20, they would not be clamping the terminal 12 at the maximum safe positive or negative voltage, but rather to a voltage below this voltage by the drop across transistor 54. Hence, the voltages on the anode of diode 90 and the cathode of diode 92 must both be translated in the positive direction.

Accordingly, a biasing network is provided for each of the switching diodes. For the diode 92, this switching circuit includes the transistor 98 and the resistor voltage divider 101. As shown, the emitter of transistor 98, an NPN transistor, is connected to the overload signal lead 20. The base is connected to a fixed potential derived from the divider 101 connected between the −10 volt lead and output terminal 16. The transistor collector is connected through the resistor 100 to the +5 volt supply.

Under normal circumstances, when the amplifier is not overloaded, the bias at the base of transistor 98 is sufficiently high so that the transistor is cut off. Hence the collector of transistor 98 is at +5 v. and diode 92 is not conducting. Should a positive overload be applied at the terminals 32 and 14, the current through transistor 54 will be reduced, as previously explained, and the potential at the collector of transistor 54 will drop toward −5 v. However the base potential on transistor 98 remains substantially constant. The transistor 98 therefore begins to conduct which drops the potential at the collector of transistor 98. Diode 92 switches to the "on" condition. Should the overload be removed, the transistor 54 will begin to conduct more heavily and the potential at the collector of transistor 54 will rise cutting off flow through transistor 98 and opening the switch 92. The effect of transistor 98 is to "translate" upward the voltage at the collector of transistor 54, before it is applied to diode 92, to the proper level for operation of the diode switch 92 at a potential corresponding to the desired limit on input voltage to the amplifier 10.

The biasing network for switch 90 is different than that used with the diode 92. Two diodes 102 and 104 are connected in series with a resistor 106 between the collector of transistor 54 and the +5 volt supply. The diodes and resistor divide the voltage between the +5 volt supply and the collector of transistor 54 between them. The anode of switching diode 90 is connected to the junction of the resistor 106 and the series connected diodes; this point varies in potential with the collector potential but is "positive" with respect to it, the diodes acting, in effect as "batteries." The bias on diode 90 is of an amount such that it will switch "on" before transistor 54 saturates, as it would with a negative input signal overload. Once the diode 90 switches terminal 12 is clamped at the switching potential and current is supplied through it and the impedance 30 to maintain the potential at terminal 12 at the safe negative limit.

The resistor 108 connected between the junction of diode switches 90 and 92 and the output terminal 16 of the amplifier 10 provides a leakage path for any current passed by the switch diodes before they switch fully "on." If they have not switched fully, the buffer diodes 94 or 96 will not conduct and a path must be provided for leakage current. However, once the diode switch is fully "on" the diode 94 or 96 conducts and has a much lower impedance than does the resistor 108. Current is then passed to the input terminal 12 of the amplifier.

Figure 3:
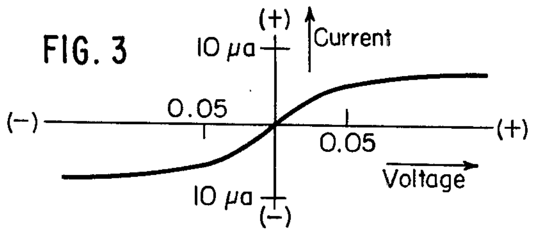
FIG. 3 is a sketch showing the nonlinear characteristics of the series connected diodes utilized in FIG. 2.

The impedance 30 shown in FIG. 1 is provided by a pair of diodes 110 and 112 connected as shown in FIG. 2. FIG. 3 illustrates the current voltage characteristic of these diodes. For small currents (less than 10 microamperes) and for small voltages in the vicinity of the origin, it will be observed that the reverse characteristics of this series combination of diodes has a fairly linear slope, corresponding to a fairly low impedance. With amplifiers having extremely high input impedance the input current is of the order of hundredths of a microampere. Hence, under normal operating conditions the diodes present only a very nominal input resistance e.g. something of the order of 2500 ohms or less, which is negligibly small in comparison to the input impedance of the amplifier. However, under overload conditions the current sources controlled by the switching diodes 90 or 92 are connected to this terminal. The current flow through the diodes 110 and 112 may be greater than a few microamperes causing the diode to operate in the nonlinear high impedance region of its characteristics. This high impedance under overload conditions limits the current which must be supplied through the switching diodes, thereby reducing the required current capacity of the current sources and the power dissipation requirements of the impedance 30. While not a requirement for proper operation of the circuit of my invention, the nonlinear impedance provided by the reverse characteristics of the diodes 110 and 112 is a desirable feature for the reasons given above.

By operation of the circuit so far described the amplifier input voltage is limited to its maximum safe value, either positive or negative depending upon the overload direction, in the presence of an overload. In practice I have found it desirable not only to limit the amplifier to a safe input voltage but to limit it to a voltage in the linear operating region of the amplifier. When thus limited, after an overload condition is removed, the amplifier can immediately begin operation without the necessity of waiting until the condensers in the amplifier discharge to their normal operating potentials.

Thus, I have provided an improved limiter and overload protection circuit for use with high impedance amplifiers. This circuit senses an overload condition by monitoring a potential associated with the amplifier output stage, and when an overload condition is detected, operates a switch to clamp the input voltage to the amplifier to a safe value within the linear operating region; it also connects to the input terminal of the amplifier a current source of the proper polarity to supply current through an impedance to maintain the amplifier input terminal at this potential so long as the voltage to be amplified exceeds a safe value. In practice the circuit of my invention has protected an amplifier such as illustrated in FIG. 2 from input voltage overloads as great as 500 times maximum normal input signals and from output short circuits. Recovery from these overload conditions takes palce in less than 10 microseconds.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An overload protection and limiter circuit for an electrical signal amplifier having a high input impedance, said amplifier including a pair of input terminals, a pair of output terminals, a first of said input and a first of said output terminals being connected in common, and a lead connected to said amplifier providing a signal indicating the condition of loading of said amplifier, said lead being connected to a point in said amplifier other than the second output terminal thereof, said point being isolated from said second output terminal, said circuit comprising, in combination, a current source, a switch including means responsive to the signal on said lead for operating said switch, first means connecting said current source between the first output terminal of said amplifier and a first terminal of said switch, second means connecting said first terminal of said switch to said overload signal lead, third means connecting a second terminal of said switch to the second of said amplifier input terminals, and fourth means connecting an impedance in series between the second of said input terminals and a terminal to which the signal said amplifier is to amplify is applied.

2. The combination defined in claim 1 in which said switch includes a diode.

3. The combination defined in claim 2 in which said second means connecting a first terminal of said switch to said overload signal lead includes means for translating said load indicator signal voltage to a voltage which is substantially identical to the voltage at said amplifier input terminal when said load indicator signal reaches a predetermined maximum value whereby said amplifier input is clamped to said predetermined maximum voltage by said diode and said current source.

4. The combination defined in claim 3 in which said impedance includes at least one diode so connected that it is reverse biased for current flow through said switch caused by said current source.

5. An overload protection and limiter circuit for an electrical signal amplifier having high input impedance, said amplifier including a pair of input terminals, a pair of output terminals, a first of said input and a first of said output terminals being connected in common, and a lead providing a signal indicating the condition of loading of said amplifier, said lead being connected to a point in said amplifier other than the second output terminal thereof, said point being isolated from said second output terminal, said circuit comprising in combination, first means providing a pair of current sources of opposite polarity, a pair of switches, each of said switches including means responsive to said load indicating signal for operating said switches selectively in accordance with the polarity of the load indicating signal, second means connecting a first terminal of each of said switches to corresponding terminals of said current sources, the other terminals of said sources being connected to said first amplifier output terminal, third means connecting the first terminal of each of said switches to said overload signal lead, fourth means connecting a second terminal of each of said switches to the second of said amplifier input terminals, and fifth means connecting an impedance in series between the second of said amplifier input terminals and a terminal to which the signal said amplifier is to amplify is applied.

6. The combination defined in claim 5 in which each of said switches includes a diode, said diodes being poled in opposite directions, the second terminals of said diodes being connected in common.

7. The combination defined in claim 6 in which said third means connecting the first terminal of each of said diodes to said overload signal lead includes means for translating said load indicator signal voltage when said amplifier output signal has reached a predetermined maximum value to a voltage which is substantially identical to the voltage at said amplifier input terminal, whereby said amplifier input voltage is clamped to said predetermined maximum voltage by one of said diodes and the current source connected thereto.

8. The combination defined in claim 7 in which said impedance includes a pair of diodes, at least one set of like elements of said diodes being connected together, the series combination of said diodes being reverse biased for current flow in either direction therethrough.

References Cited by the Examiner

UNITED STATES PATENTS

| | | | |
|---|---|---|---|
| 2,817,715 | 12/57 | Blake | 330—185 |
| 2,999,169 | 9/61 | Feiner | 307—88.5 |
| 3,012,197 | 12/61 | Peterson et al. | 324—130 |
| 3,027,466 | 3/62 | Roalef | 307—88.5 |
| 3,094,670 | 6/63 | Batchelor | 330—110 X |
| 3,121,199 | 2/64 | Harrison | 328—128 |

FOREIGN PATENTS

| | | |
|---|---|---|
| 616,699 | 1/49 | Great Britain. |
| 764,861 | 2/57 | Great Britain. |
| 845,092 | 8/60 | Great Britain. |
| 848,921 | 9/60 | Great Britain. |

ROY LAKE, *Primary Examiner.*